July 25, 1933. W. C. LEINGANG 1,919,891

CHARGING CIRCUIT FOR STORAGE BATTERIES

Filed May 28, 1930

WITNESS:

INVENTOR
William C. Leingang
BY
Augustus B. Broughton
ATTORNEY.

Patented July 25, 1933

1,919,891

UNITED STATES PATENT OFFICE

WILLIAM C. LEINGANG OF DETROIT, MICHIGAN

CHARGING CIRCUIT FOR STORAGE BATTERIES

Application filed May 28, 1930. Serial No. 456,387.

My invention comprises a charging circuit for storage batteries consisting of a generator of electric current, a storage battery connected thereto, a relay responsive to the voltage of the storage battery and controlling the field coil of the generator and a thermostat connected to the relay to control, in accordance with the surrounding temperature, the voltage at which the relay operates.

For a further description of my invention reference may be had to the annexed drawing and specification at the end whereof the invention will be specifically pointed out and claimed.

Figure 1:
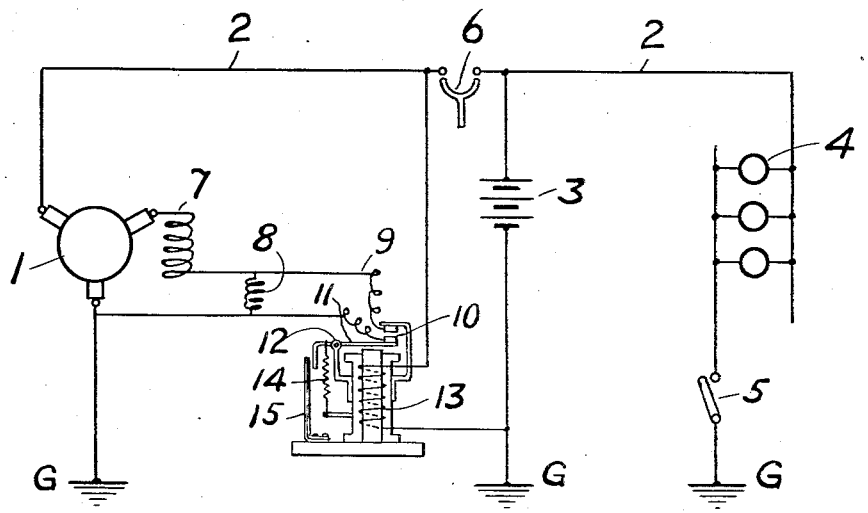
Figure 1 is a diagram showing my novel circuit.

In the embodiment chosen for illustration in the drawing and especially in Figure 1 there is shown a generator 1 of electric current shown as of the three brush type. Connected to one of the brushes, of the generator 1 is a circuit 2 leading to a storage battery 3 and to translating devices 4 which are adapted to draw current from the generator 1 or from the storage battery 3 when the manual switch 5 is closed. Interposed between the generator 1 and battery 3 and translating devices 4 is an automatic switch 6 of any well known type. The opposite sides of generator 1, storage battery 3 and translating devices 5 from circuit 2 are grounded as indicated at G.

Attached to the third brush of generator 1 is field coil 7 which has in series therewith resistor 8. In parallel with resistor 8 is circuit 9, containing the circuit breaker contacts 10.

One of the contacts 10 is mounted on armature 11 which is pivotally mounted at 12. Armature 11 is adapted to be actuated by coil 13, the latter being connected so as to be responsive to the voltage of battery 3 when switch 6 is closed. There is also connected to arm 11 spring 14 which urges arm 11 in the opposite direction to the stress of coil 13. On the same side of the pivot 12 as spring 14 is a bi-metallic thermostat 15 adapted to contact in cold position with one end of the armature 11.

The operation of my circuit is as follows.—When the switch 6 is closed and the generator 1 is operated field current in the generator traverses coil 7 and either passes through resistor 8 or is short circuited around resistor 8, depending upon the position of the switch contacts 10. A charging current therefore flows through circuit 2, switch 6, battery 3 and G. When the voltage of storage battery 3 has risen to a predetermined point coil 13 operates armature 11 and opens the switch contacts 10, thereby putting resistance 8 in series with field coil 7 and hence decreasing the amount of field current of generator 1 and hence the amount of charging current through battery 3. The voltage at which coil 13 operates armature 11 is controlled by thermostat 15. When the thermostat is cold it contacts against one end of armature 11 and adds its pressure to that of spring 14. Both these pressures must be overcome by coil 13 before the switch contacts 10 can be open.

It follows from the above that when the relay is subjected to a cold temperature, a higher battery voltage will be required to open the contacts 10, this result being desired on account of the fact that at lower temperatures the battery voltage will reach a higher value corresponding to a given state of charge, and it is desired that the contacts 10 shall open and the charging rate of the battery be reduced at the same state of charge in cold weather as in warm weather.

Figure 2:
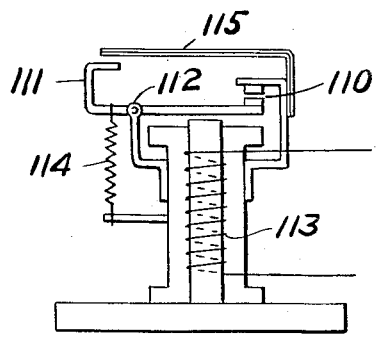
Figure 2 shows a modified form of relay.

In Figure 2 there is shown a modified form of relay very similar to that disclosed in Figure 1. This relay has a coil 113 adapted to actuate armature 111 which carries one of the switch contacts 110 and which is pivoted at 112. Bi-metallic thermostat 115 has its movable end adjacent the opposite end of armature 111 from that on which switch contact 110 is mounted. There is also attached to this side of armature 110 spring 114. When thermostat 115 is cold it moves into contact with the end of armature 111 and adds its pressure to that of spring 114 so that both pressures must be overcome by coil 113 before this coil can actuate armature 111.

It will be, of course, recognized that the armatures may be mounted in different types of leverage and that other types of thermostat may be employed. I do not intend to be limited in the practice of my invention save as the scope of the prior art and of the attached claims may require.

I claim:

1. A charging circuit for storage batteries including in electrical connection and combination: an electric generator, a storage battery, a translating device, a field coil for said generator, a resistor in series with said field coil, a relay including a circuit maker and breaker in parallel with said resistor and a coil adapted to actuate said circuit maker and breaker in accordance with the condition of said battery and a spring adapted to stress the circuit breaker to close the circuit paralleling said resistor, and a thermostat mounted on said relay independently of said circuit maker and breaker and adapted to apply additional pressure directly and independently of said spring to said circuit maker and breaker in response to reduction of temperature.

2. A charging circuit for storage batteries including in electrical connection and combination: an electric generator, a storage battery, a translating device, a field coil for said generator, a resistor in series with said field coil, a relay including a circuit breaker in parallel with said resistor and a coil adapted to actuate said circuit breaker in accordance with the condition of said battery, and a thermostat, mounted on said relay and independent and separate from but operable into and out of mechanical contact with said circuit breaker so as to regulate the point at which the relay operates.

3. A charging circuit for storage batteries including in electrical connection and combination: an electric generator, a storage battery, a field coil for said generator, a resistor in series with said field coil, a relay including a current breaker in parallel with said resistor and a coil adapted to actuate said circuit breaker in accordance with the condition of said battery, and a thermostat mounted on said relay and independent and separate from but operable into and out of mechanical contact with said circuit breaker so as to regulate the point at which the relay operates.

WILLIAM C. LEINGANG.